US012654653B2

(12) United States Patent
Bessemans et al.

(10) Patent No.: US 12,654,653 B2
(45) Date of Patent: Jun. 16, 2026

(54) METHOD FOR A RETROFITTING OF A VEHICLE, METHOD FOR AN OPERATION, CLEANING APPARATUS, RETROFITTING SYSTEM, KIT, AND VEHICLE

(71) Applicant: Robert Bosch GmbH, Stuttgart (DE)

(72) Inventors: Filip Bessemans, Duras (BE); Helmut Depondt, Boutersem (BE)

(73) Assignee: Robert Bosch GmbH, Stuttgart (DE)

( * ) Notice: Subject to any disclaimer, the term of this patent is extended or adjusted under 35 U.S.C. 154(b) by 336 days.

(21) Appl. No.: 18/454,198

(22) Filed: Aug. 23, 2023

(65) Prior Publication Data

US 2024/0067133 A1 Feb. 29, 2024

(30) Foreign Application Priority Data

Aug. 24, 2022 (DE) ..................... 10 2022 208 753.4

(51) Int. Cl.
*B60S 1/52* (2006.01)

(52) U.S. Cl.
CPC ..................................... *B60S 1/524* (2013.01)

(58) Field of Classification Search
CPC ................................ B60S 1/522; B60S 1/524
See application file for complete search history.

(56) References Cited

U.S. PATENT DOCUMENTS 5,383,247 A * 1/1995 Nickel .................... B60S 1/546
15/250.04
2009/0139551 A1* 6/2009 Opel ................... F16L 37/0985
134/114

FOREIGN PATENT DOCUMENTS

CN 201736958 U 2/2011
FR 2973315 A1 10/2012

* cited by examiner

*Primary Examiner* — Andrew A Horton
(74) *Attorney, Agent, or Firm* — Michael Best & Friedrich LLP

(57) ABSTRACT

A method for retrofitting a vehicle, which is equipped with a spray unit mounted to be fixed relative to a vehicle window of the vehicle, having a wiper comprising a further spray unit mounted to be movable relative to the vehicle window. The fixed spray unit comprises at least one pump, which is provided for supplying a cleaning fluid pressure for the fixed spray unit. In at least one installation step, the further spray unit of the wiper is connected to the pump of the fixed spray unit.

6 Claims, 6 Drawing Sheets

32c

34c

METHOD FOR A RETROFITTING OF A VEHICLE, METHOD FOR AN OPERATION, CLEANING APPARATUS, RETROFITTING SYSTEM, KIT, AND VEHICLE

BACKGROUND

A method has previously been proposed for retrofitting a vehicle, which is equipped with a spray unit mounted to be fixed relative to a vehicle window of the vehicle, with a wiper comprising a further spray unit mounted to be movable relative to the vehicle window, the fixed spray unit comprising at least one pump, which is provided for supplying a cleaning fluid pressure for the fixed spray unit.

SUMMARY

The invention relates to a method for retrofitting a vehicle, which is equipped with a spray unit mounted to be fixed relative to a vehicle window of the vehicle, with a wiper comprising a further spray unit mounted to be movable relative to the vehicle window, the fixed spray unit comprising at least one pump, which is provided for supplying a cleaning fluid pressure for the fixed spray unit.

It is proposed that, in at least one installation step, the further spray unit of the wiper is connected to the pump of the fixed spray unit.

By means of the embodiment of the method according to the invention for retrofitting a vehicle, a cleaning apparatus can advantageously be retrofitted in order to improve a cleaning performance of the vehicle window, in particular by means of various operating modes. Advantageously, a cleaning fluid consumption can be reduced, in particular by a targeted application on the vehicle window. Advantageously, using the proposed method, any desired vehicle can be equipped with a further spray unit integrated into a wiper in a in particular simple and/or inexpensive manner.

The term "retrofitting" is understood in particular to mean a subsequent installation of an apparatus, in particular of a cleaning apparatus. Preferably, the cleaning apparatus is retrofitted on an already existing and/or completed vehicle, in particular a passenger car, a commercial vehicle, or a rail vehicle, or a ship, or an aircraft, or a drone. Preferably, in the method for retrofitting the vehicle, a wiper comprising an integrated further spray unit is attached to a wiping arm, or a wiper with an integrated further spray unit and a wiping arm is attached to a wiping drive, or a further spray unit is attached to the already existing wiper, in particular a wiper blade of the wiper, in particular in a positively locking manner.

A "wiper" is preferably understood to mean at least a part, preferably a subassembly of a window wiper. Preferably, the wiper is provided for use on a vehicle, in particular a passenger car, a commercial vehicle, or a rail vehicle, or a ship, or an aircraft, or a drone. The wiper preferably forms a part of the window wiper. The wiper, in particular as part of the window wiper, is preferably designed for cleaning a surface, preferably a surface of a window, preferably a vehicle window, on a vehicle. The wiper is preferably connected to a vehicle, preferably to a wiper drive of the vehicle, for cleaning the window, preferably the vehicle window, e.g. a windshield. An object being provided or designed or configured for a specific function is preferably understood to mean that the object fulfills and/or performs this specific function in at least one application and/or operating state. The term "operating state" is preferably understood to mean a state in which the window wiper is ready for a wiping process and/or a wiping operation and/or is in a wiping operation in which the wiper, preferably a wiper blade of the wiper, in particular of the window wiper, is preferably guided over a vehicle window and thereby advantageously bears against the vehicle window.

Preferably, in the installation step, the further spray unit of the wiper is connected to the pump via a line unit, in particular in a fluidically sealed manner. Preferably, the line unit is flexibly designed. Preferably, the line unit comprises at least one fluid line and one electrical line. Preferably, the fixed and/or further spray unit is supplied with cleaning fluid via the fluid line. Preferably, two free ends of the fluid line form connection points, in particular in a fluidically sealed manner. Preferably, a free end of the fluid line is attached to the fixed and/or further spray unit, and a further end of the fluid line is attached to the pump, in which case the two connection points are fluidically sealed. Preferably, the fixed and/or further spray unit is supplied with electrical energy via the electrical line for actuating and/or controlling the fixed and/or further spray unit. Preferably, the fluid line is connected to the pump in order to supply the further spray unit with cleaning fluid, and the electrical line is connected to a control-and-regulation unit for controlling the fixed and/or further spray unit. Preferably, a cleaning fluid pressure is provided by the pump, which supplies cleaning fluid, in particular washing water, to the fixed and/or further spray unit. Preferably, the fixed spray unit comprises at least one spray element, in particular a spray nozzle, which is mounted to be fixed relative to the vehicle window and is provided for applying the cleaning fluid to the vehicle window. In particular, the fixed spray unit is designed and arranged separately from the further spray unit. In particular, the fixed spray unit is integrated into a hood of the vehicle and/or installed in an edge region around the vehicle window. Preferably, the further spray unit of the wiper and the fixed spray unit are actuated exclusively simultaneously and/or supplied with cleaning fluid via the pump, in particular due to the connection via a common line unit.

In particular, the term "cleaning fluid" is in this context understood to mean water or washing water mixed with an anti-freeze additive and/or a detergent additive and/or another additive for improving the cleaning performance and/or the operating characteristics. It is conceivable that the cleaning fluid is designed exclusively as water.

Furthermore, it is proposed that, in the installation step, in addition to the fixed spray unit, the further spray unit of the wiper is connected to the pump of the fixed spray unit. Advantageously, a simple and/or inexpensive equipping of any desired vehicle with the further spray unit integrated into a wiper can be enabled. Advantageously, an amount of cleaning fluid applied to the window can be increased, because the fixed spray unit and the further spray unit are supplied in particular with cleaning fluid. Advantageously, a cleaning performance can be improved, because more cleaning fluid is applied to the vehicle window, in particular. Preferably, in the installation step, the further spray unit of the wiper is connected to the pump of the fixed spray unit, in particular via a line unit comprising at least one fluid line and one electrical line. Preferably, at least the fluid line and/or the electrical line of the line unit is attached to the wiping arm. Preferably, the further spray unit of the wiper is connected to the pump such that the fixed spray unit and the movably mounted further spray unit are connected to the pump simultaneously, in particular in a series circuit, and supplied with washing water, in particular exclusively simultaneously.

Furthermore, it is proposed that, in the installation step, the further spray unit of the wiper is connected to the pump instead of the fixed spray unit. Advantageously, a simple and/or inexpensive equipping of any desired vehicle with a further spray unit integrated into a wiper can be enabled. Advantageously, the cleaning fluid can be applied in a very targeted manner, in particular punctually and/or locally, to the vehicle window. Advantageously, an amount of cleaning fluid can be reduced, because the application of the cleaning fluid, in particular, is much more targeted. Preferably, a supply line from the pump to the fixed spray unit is clamped and/or disconnected and/or sealed in the installation step. Preferably, the supply line to the further spray unit mounted to be movable relative to the vehicle window, in particular the connector which is provided for the supply to the fixed spray unit, is connected to the pump in a fluidically sealed manner. Preferably, the further spray unit of the wiper is connected to the pump such that only the movably mounted further spray unit is connected to the pump and is supplied with washing water.

In addition, a method for operating the retrofitted vehicle is proposed, whereby, in at least one method step, the further spray unit of the wiper and/or the fixed spray unit is selectively activated, in particular by means of a switchable valve. Advantageously, and in particular depending on a cleaning situation, a maximum cleaning performance or a reduced consumption of the cleaning fluid can be selected. Preferably, the valve, in particular the 3-way valve, is actuated electronically. Preferably, the valve is connected to the line unit in a fluidically sealed manner. Preferably, the electrical line and/or a further electrical line of the line unit is electrically connected to the valve to a control means, in particular the control-and-regulation unit of the vehicle. Preferably, the further spray unit of the wiper is connected to the pump such that the fixed spray unit and the movably mounted further spray unit are operated simultaneously and/or individually and/or independently of one another, in particular in a series or parallel circuit.

In addition, the cleaning apparatus is proposed in a vehicle, in particular a retrofitted vehicle, for cleaning the vehicle window of the vehicle by means of the cleaning fluid with the fixed spray unit, comprising at least one spray element mounted to be fixed relative to the vehicle window for applying the cleaning fluid to the vehicle window, at least one pump provided for supplying a cleaning fluid pressure for the fixed and/or further spray unit, and at least one line unit for distributing the cleaning fluid pressurized by the pump, the cleaning apparatus comprising a wiper having a further spray unit mounted to be movable relative to the vehicle window for applying the cleaning fluid to the vehicle window, said wiper being connected via the line unit to the pump instead of the fixed spray unit or in addition to the fixed spray unit. Advantageously, the cleaning fluid can be locally applied in a very targeted manner to the vehicle window. Advantageously, and in particular depending on a cleaning situation, a maximum cleaning performance or a reduced consumption of the cleaning fluid can be selected. Preferably, the spray element, which is mounted to be fixed relative to the vehicle window, is designed as one or more spray nozzles. Preferably, the spray nozzles are arranged on the wiper or on the wiper blade. Preferably, the spray nozzles are evenly distributed in a main extension direction of the wiper blade. Preferably, a spray direction if the spray nozzles is aligned at least substantially parallel to the vehicle window, in particular to a wiping plane of the wiper. The term "main extension direction" of an object is in this context in particular understood to mean a direction which runs parallel to a longest edge of a smallest geometrical cuboid, which just completely encloses the object.

Preferably, the line unit comprises at least one fluid line and one electrical line. Preferably, the fluid line is provided for supplying cleaning fluid to the fixed and/or further spray unit. Preferably, two free ends of the fluid line form connection points, in particular in a fluidically sealed manner. Preferably, a free end of the fluid line is attached to the fixed and/or further spray unit, and a further end of the fluid line is attached to the pump, in which case the two connection points are designed to be fluidically sealed. Preferably, the electrical line is provided for supplying electrical power to the fixed and/or further spray unit for the purposes of actuation. Preferably, the fluid line is connected to the pump in order to supply the fixed and/or further spray unit with cleaning fluid, and the electrical line is connected to a control-and-regulation unit for controlling the fixed and/or further spray unit. Preferably, the pump provides a cleaning fluid pressure which supplies cleaning fluid, in particular washing water, to the fixed and/or further spray unit. Preferably, the fixed spray unit comprises at least one spray element, in particular a spray nozzle, which is mounted to be fixed relative to the vehicle window and is provided for applying the cleaning fluid to the vehicle window.

Furthermore, it is proposed that the line unit comprises a switchable valve, which is provided for supplying cleaning fluid to the fixed spray unit and/or the further spray unit. Advantageously, a change, in particular depending on a cleaning situation, between a maximum cleaning performance or a reduced consumption of the cleaning fluid is possible. A cleaning fluid consumption can advantageously be reduced. Advantageously, a cleaning performance, in particular depending on the soiling situation of the vehicle window, can be improved at least temporarily by switching on the fixed spray nozzle. Preferably, the switchable valve is connected to the electrical line. Preferably, the electrical valve is provided for actuation of the fixed spray unit and/or the further spray unit. Preferably, the valve is designed as a 3-way valve. It is conceivable that the valve be configured for further operating modes for actuation of the fixed spray unit and/or the further spray unit, in particular for an actuation exclusively of the fixed spray unit.

It is further proposed that the line to the fixed spray unit and/or the further spray unit of the wiper comprises a check valve that prevents a backflow of the cleaning fluid. Advantageously, a cleaning fluid consumption can be reduced, because residual amounts of cleaning fluid are prevented from dripping out. Advantageously, soiling of the window by dripping cleaning fluid can be prevented. Particularly advantageously, a function of the cleaning apparatus can be ensured because an idling of the pump caused by a backflow of the cleaning fluid can in particular be prevented. Preferably, the check valve is provided in order to prevent uncontrolled leakage and/or backflow, in particular onto the vehicle windows. Preferably, the check valve is provided in order to prevent the cleaning fluid from flowing back into a cleaning fluid tank so as to prevent idling and/or aspiration of air through the pump. Preferably, the check valve is designed in an automatic manner. Preferably, the check valve enables a fluid, in particular cleaning fluid, to flow exclusively in one direction, in particular in the direction of flow directed from the pump to the nozzle. Preferably, the check valve is arranged between the pump and the spray nozzle.

In addition, a retrofitting system for retrofitting a vehicle with the cleaning apparatus is proposed, comprising at least the wiper with the further spray unit, the line unit, and in particular a switchable valve and/or a check valve. Advantageously, a vehicle, in particular one of various vehicle models, can be retrofitted with the cleaning apparatus. Preferably, the retrofitting system comprises assembly aids, in particular cable ties and/or tape and/or assembly instructions and/or assembly tools and/or software for a control means. Preferably, the retrofitting system is individually manufactured for each vehicle model. Preferably, a retrofitting system is suitable and/or usable for a vehicle model.

Furthermore, a kit for retrofitting various vehicles with cleaning apparatuses is proposed, comprising at least a plurality of wipers that are designed to differ from one another, which are provided for various vehicles and/or comprise variously designed further spray units, a plurality of variously designed line units, which are provided for various vehicles and/or render various spraying functions, and optionally a plurality of various adapters for various pumps. Advantageously, the cleaning apparatus can be retrofitted on any desired vehicle model. Preferably, the kit comprises assembly aids, in particular cable ties and/or tape and/or assembly instructions and/or assembly tools and/or software for a control means. Preferably, the kit is universally usable for a large number of vehicle models. In particular, the kit can be used in order to assemble a suitable retrofitting system for a plurality of various vehicle models.

In addition, a vehicle with a cleaning apparatus is proposed. Advantageously, a cleaning performance can be improved, because in particular the amount of washing water is increased for the cleaning of the vehicle window and/or an amount of washing water can be applied in a more targeted manner to the vehicle window by dispensing the washing water directly at the wiper blade. Preferably, the cleaning apparatus is attached to a windshield. It is also conceivable that the cleaning apparatus be attached to a rear window and/or to side windows and/or to headlights and/or sensors.

The method according to the invention for retrofitting a vehicle, the method according to the invention for operation, the cleaning apparatus according to the invention, the retrofitting system according to the invention, the kit according to the invention, and the vehicle according to the invention are not intended to be limited to the application and embodiment described hereinabove. In particular, the method according to the invention for retrofitting a vehicle, the method according to the invention for operation, the cleaning apparatus according to the invention, the retrofitting system according to the invention, the kit according to the invention, and the vehicle for fulfilling a function described herein can feature a number that is different from a number of individual elements, components, and units as well as method step s specified herein. Moreover, regarding the ranges of values indicated in this disclosure, values lying within the aforementioned limits are also intended to be considered as being disclosed and usable as desired.

BRIEF DESCRIPTION OF THE DRAWINGS

Further advantages will become apparent from the following description of the drawings. The drawings illustrate three exemplary embodiments of the invention. The drawings, the description, and the claims contain numerous features in combination. The skilled person will appropriately also consider the features individually and merge them into additional advantageous combinations.

Shown are.

DETAILED DESCRIPTION

Figure 1:
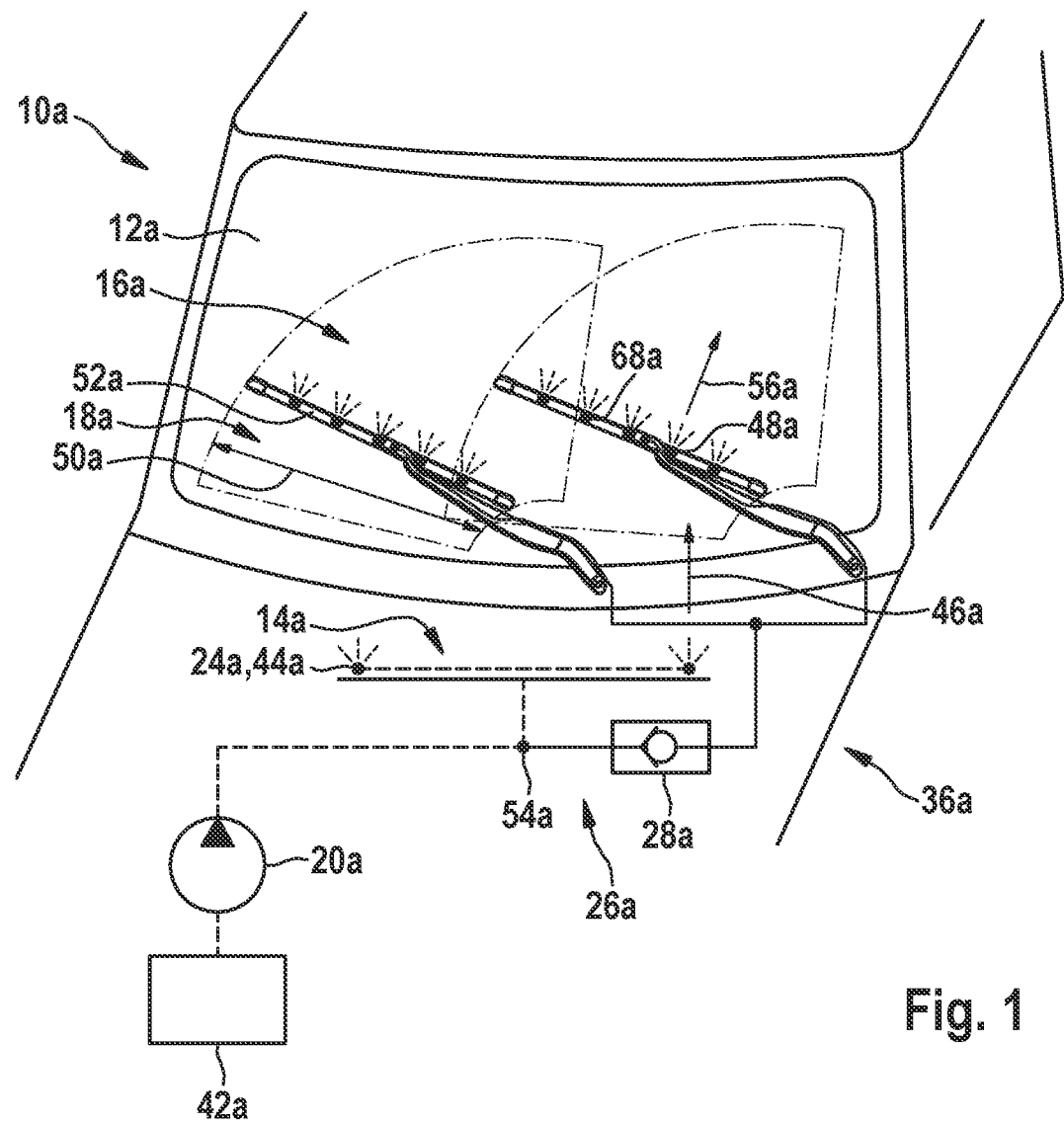
FIG. 1 a schematic illustration of a vehicle retrofitted with a cleaning apparatus, FIG. 2 a schematic illustration of an alternative cleaning apparatus, FIG. 3 a schematic illustration of a further alternative cleaning apparatus, FIG. 4 a schematic flowchart of a method for retrofitting a cleaning apparatus, FIG. 5 a schematic flowchart of the operation of a retrofitted cleaning apparatus, FIG. 6 a schematic illustration of a retrofitting system for retrofitting the vehicle with the cleaning apparatus, and FIG. 7 a schematic illustration of a kit for retrofitting various vehicles with suitable cleaning apparatuses.

FIG. 1 shows a vehicle 10a. The vehicle 10a comprises a vehicle window 12a. The vehicle 10a is retrofitted by means of a method for retrofitting on the vehicle 10a. The vehicle 10a comprises a cleaning apparatus 36a. The cleaning apparatus 36a has been retrofitted on the vehicle 10a. The cleaning apparatus 36a is provided for cleaning the vehicle window 12a of the vehicle 10a. The cleaning of the vehicle window 12a is performed by means of a cleaning fluid. The cleaning fluid is designed as washing water. The washing water can, e.g., contain an anti-freeze additive and/or a detergent additive and/or another additive for improving the cleaning performance and/or the operating characteristics. The vehicle 10a comprises a cleaning fluid tank 42a. The cleaning fluid tank 42a contains the cleaning fluid. The cleaning apparatus 36a comprises a fixed spray unit 14a. The fixed spray unit 14a was already part of the vehicle 10a before the retrofitting. The fixed spray unit 14a comprises two spray elements 24a mounted to be fixed relative to the vehicle window 12a. The fixed spray unit 14a could also only comprise one spray element 24a that is mounted to be fixed relative to the vehicle window 12a. The spray element 24a is provided for applying the cleaning fluid to the vehicle window 12a. Each spray element 24a comprises a dispensing opening 44a. The dispensing openings 44a have a dispensing direction 46a. The dispensing direction 46a is aligned approximately parallel to the vehicle window 12a. The fixed spray unit 14a comprises a pump 20a. The pump 20a is provided for supplying a cleaning fluid pressure for the fixed spray unit 14a. The pump 20a was already part of the vehicle 10a before the retrofitting. The fixed spray unit 14a comprises a line unit 26a. The line unit 26a is provided for distributing the cleaning fluid pressurized by the pump 20a. The line unit 26a is designed as a plastic hose. The line unit 26a could also be designed as a tube made of a metallic material. The vehicle 10a previously comprised a line unit 26a for supplying the fixed spray unit 14a before the retrofitting. The line unit 26a is modified or replaced during the retrofitting process.

The cleaning apparatus 36a comprises a wiper 18a. The wiper 18a comprises a wiper blade 52a. The wiper 18a comprises a further spray unit 16a mounted to be movable relative to the vehicle window 12a. The wiper 18a with the further spray unit 16a is retrofitted on the vehicle 10a. The further spray unit 16a is arranged on the wiper blade 52a of the wiper 18a. The further spray unit 16a is provided for applying the cleaning fluid to the vehicle window 12a. In addition to the fixed spray unit 14a, the further spray unit 16a is also connected to the pump 20a via the line unit 26a (which has been modified or replaced compared to the initial state of the vehicle 10a). The further spray unit 16a comprises a plurality of further spray elements 48a. The further spray elements 48a are arranged to be distributed in a main extension direction 50a of the wiper blade 52a. Each further spray element 48a has a dispensing opening 68a. The dispensing openings 68a have a dispensing direction 56a. The dispensing direction 56a is aligned approximately parallel to the vehicle window 12a. The dispensing direction 56a faces toward the vehicle window 12a.

The line unit 26a (which has been modified or replaced compared to the initial state of the vehicle 10a) comprises a non-switchable connecting piece 54a. The connecting piece 54a is designed as a fluidically sealed T-piece. The connecting piece 54a could also be designed as a Y-piece. The connecting piece 54a has three openings. The openings are connected to one another in every operating state. The connecting piece 54a is provided so as to connect the fixed spray unit 14a and the further spray unit 16a to the pump 20a. The line unit 26a leading to the fixed spray unit 14a and/or the further spray unit 16a of the wiper 18a comprises a check valve 28a. The check valve 28a prevents a backflow of the cleaning fluid. The check valve 28a could be designed, for example, as a ball check valve or as a spring-loaded check valve.

Figure 2:
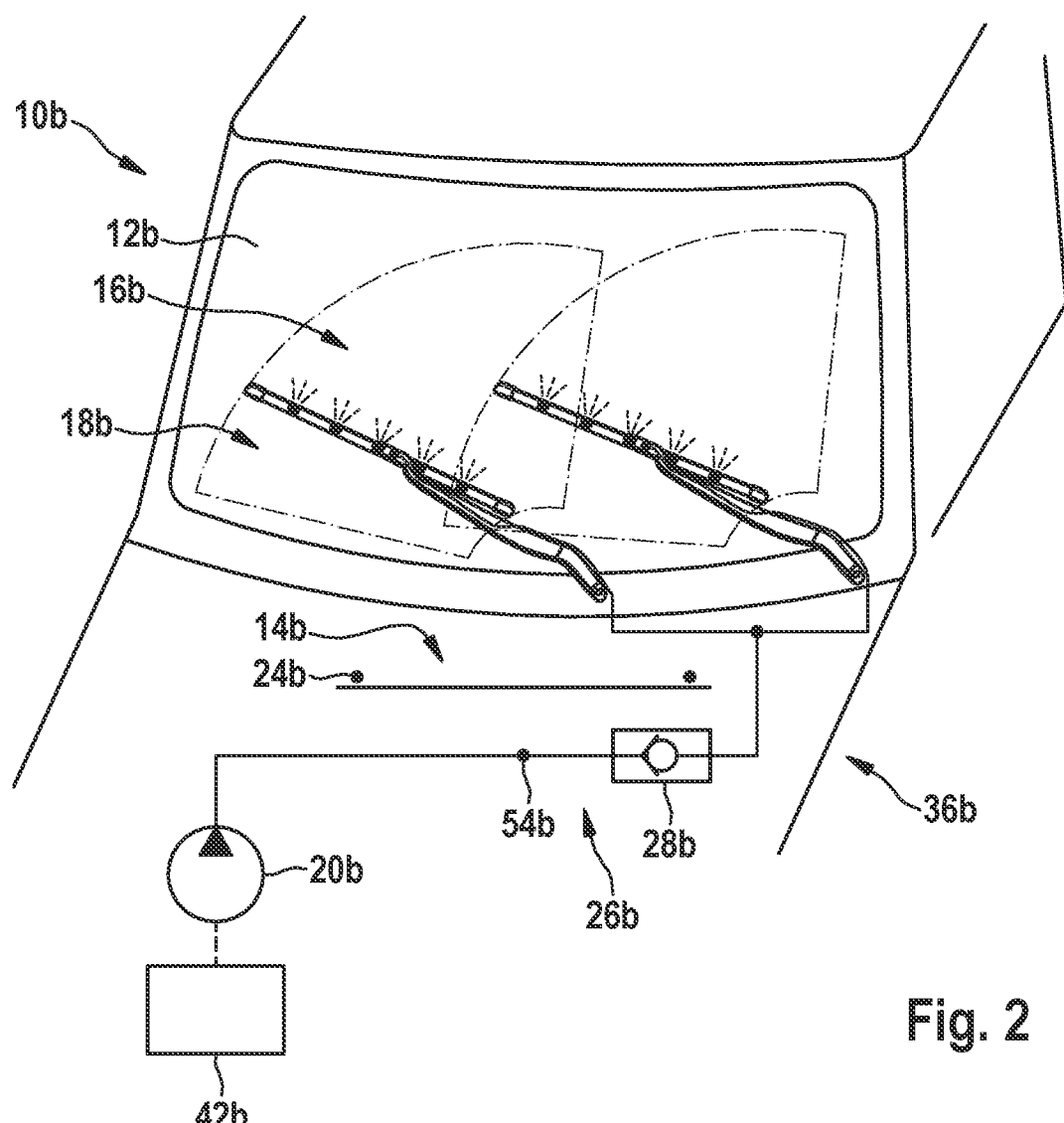
Figure 3:
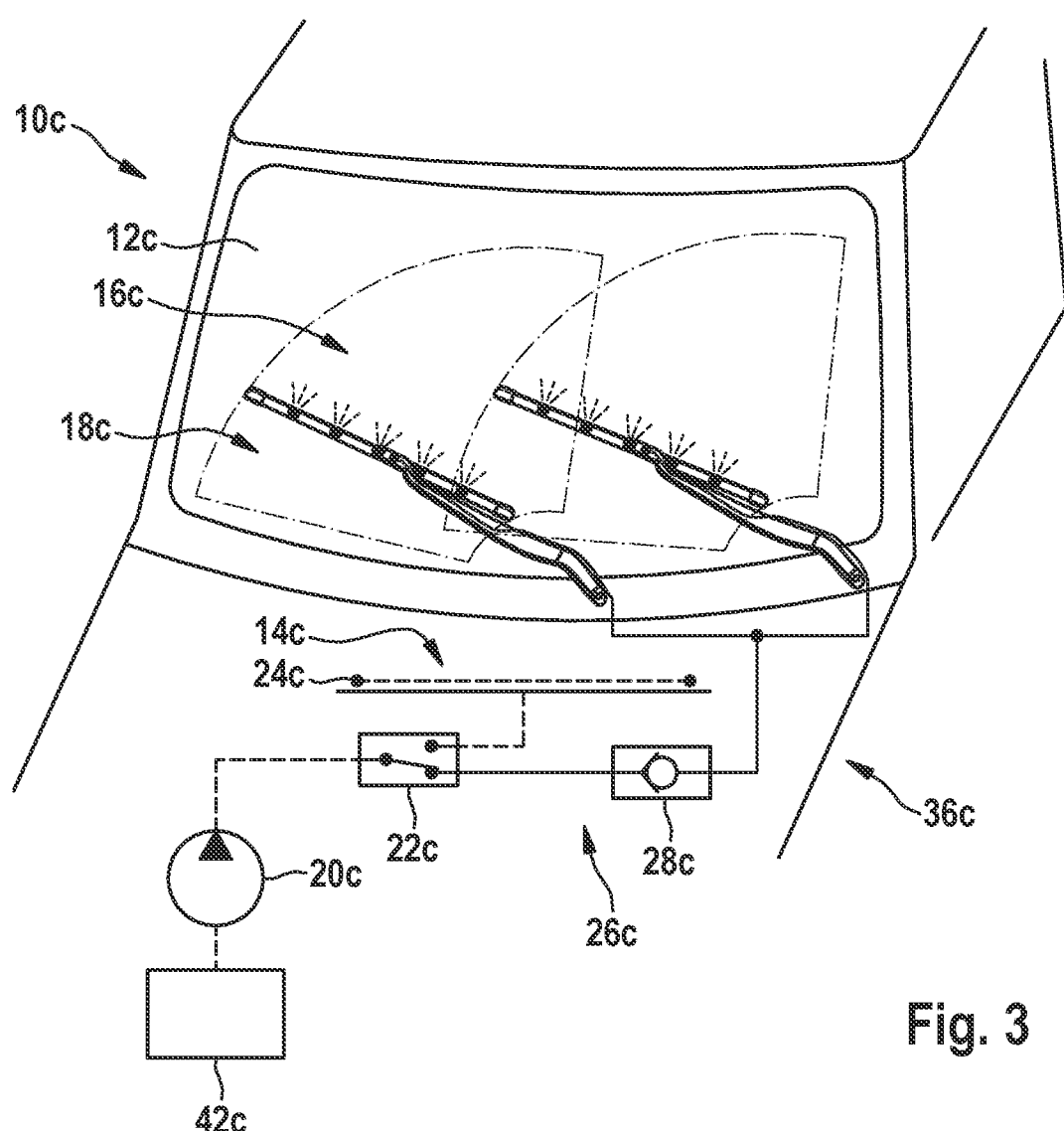

FIGS. 2 and 3 show further exemplary embodiments of the invention. The following descriptions and the drawings are essentially limited to the differences between the exemplary embodiments, whereby, with regard to components bearing the same designation, in particular with regard to components bearing the same reference characters, reference can in principle also be made to the drawings and/or the description of the other exemplary embodiments, in particular in FIG. 1. In order to distinguish between the exemplary embodiments, the letter a is appended to the reference characters for the exemplary embodiment in FIG. 1. The letter a is replaced by the letters b and c in the exemplary embodiments in FIGS. 2 and 3.

FIG. 2 shows a vehicle 10b. The vehicle 10b comprises a vehicle window 12b. The vehicle 10b is retrofitted by means of a method for retrofitting on the vehicle 10b. The vehicle 10b comprises an alternative cleaning apparatus 36b. The cleaning apparatus 36b is provided for cleaning the vehicle window 12b of the vehicle 10b. The cleaning apparatus 36b comprises a fixed spray unit 14b having a spray element 24b mounted to be fixed relative to the vehicle window 12b. The cleaning apparatus 36b comprises a line unit 26b. The line unit 26b is retrofitted. The line unit 26b replaces an original line unit of vehicle 10b. The vehicle 10b comprises a cleaning fluid tank 42b. The cleaning fluid tank 42b contains a cleaning fluid. The cleaning apparatus 36b comprises a wiper 18b. The wiper 18b comprises a further spray unit 16b mounted to be movable relative to the vehicle window 12b. Instead of the fixed spray unit 14b, the further spray unit 16b is connected to a pump 20b via the line unit 26b. The line unit 26b comprises a connecting piece 54b. The connecting piece 54b is not switchable. The connecting piece 54b is designed as a fluidically sealed I-piece. The connecting piece 54b could also be designed as an L-piece. The connecting piece 54b has two openings. The connecting piece 54b is provided so as to connect the further spray unit 16b to the pump. The fixed spray unit 14b is disconnected from the line unit 26b. The line unit 26b leading to the further spray unit 16b of the wiper 18b comprises a check valve 28b. The check valve 28b prevents a backflow of the cleaning fluid. The check valve 28b could be designed, for example, as a ball check valve or as a spring-loaded check valve.

FIG. 3 shows a vehicle 10c. The vehicle 10c comprises a vehicle window 12c. The vehicle 10c is retrofitted by means of a method for retrofitting on the vehicle 10c. The vehicle 10c comprises a further alternative cleaning apparatus 36c.

The cleaning apparatus 36c is provided for cleaning the vehicle window 12c of the vehicle 10c. The vehicle 10c comprises a cleaning fluid tank 42c. The cleaning fluid tank 42c contains a cleaning fluid. The cleaning apparatus 36c comprises a fixed spray unit 14c. The fixed spray unit 14c comprises two spray elements 24c mounted to be fixed relative to the vehicle window 12c. The fixed spray unit 14c could also only comprise one spray element 24c that is mounted to be fixed relative to the vehicle window 12c. The spray element 24c is provided for applying the cleaning fluid to the vehicle window 12c. The cleaning apparatus 36c comprises a wiper 18c. The wiper 18c comprises a further spray unit 16c mounted to be movable relative to the vehicle window 12c. The cleaning apparatus 36c comprises a line unit 26c. The line unit 26c is retrofitted. The line unit 26c replaces an original line unit of the vehicle 10c. The further spray unit 16c is connected to a pump 20c via the line unit 26c. The line unit 26c comprises a switchable valve 22c. The switchable valve 22c is provided so as to supply cleaning fluid to the fixed spray unit 14c and/or to the further spray unit 16c. The switchable valve 22c is designed as a 3-way valve. The switchable valve 22c has three openings. It is conceivable that valve 22c can be designed as a 3/2-way valve. With a 3/3-way valve, the fixed spray unit 14c and/or the further spray unit 16c could be actuated, because it has three connectors and three switch positions. The connecting piece 54c is provided in order to connect the further spray unit 16c to the pump 20c. The line unit 26c leading to the further spray unit 16c of the wiper 18c comprises a check valve 28c. The check valve 28c prevents a backflow of the cleaning fluid. The check valve 28c could be designed, e.g., as a ball check valve or as a spring-loaded check valve.

Figure 4:
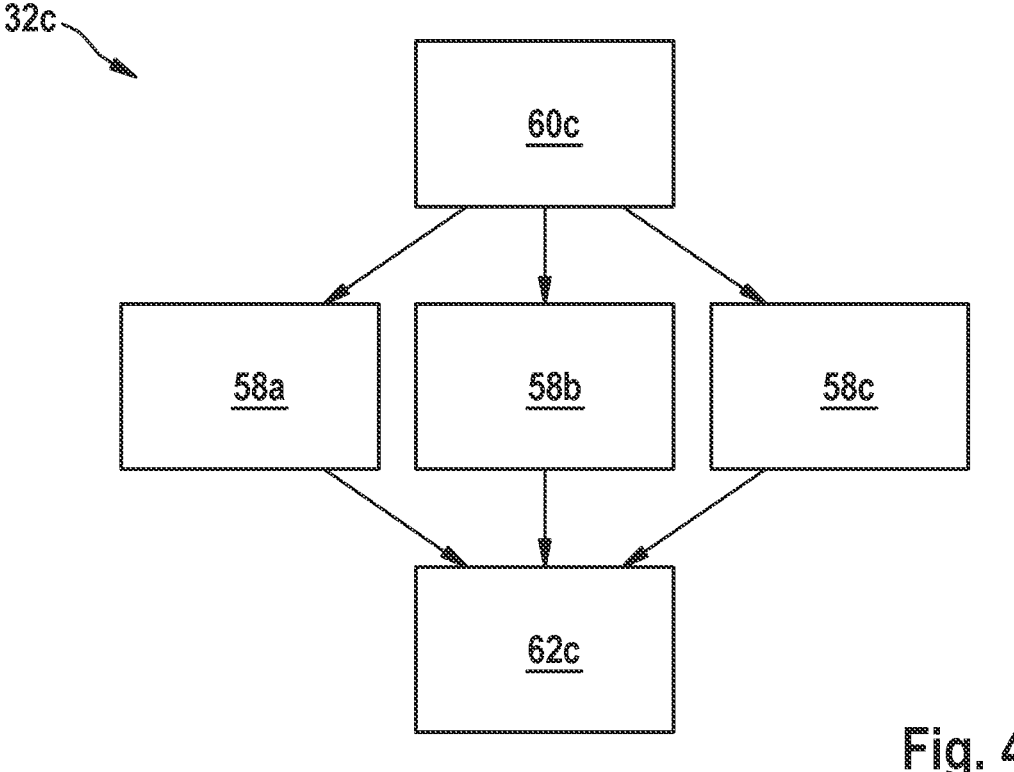

FIG. 4 shows a schematic flowchart of a method 32c for retrofitting the vehicle 10c, in which the fixed spray unit 14c is originally only connected to the pump 20c. In at least one installation step 60c, the fixed spray unit 14c is disconnected from the pump 20c. A hose connecting the pump 20c and the fixed spray unit 14c is thereby removed from the vehicle 10c. In installation step 58c, the further spray unit 16c of the wiper 18c is connected to the pump 20c of the fixed spray unit 14c. In installation step 58c, a new line unit 26c is installed, which connects the further spray unit 16c to the pump 20c in addition to the fixed spray unit 14c. The line unit 26c installed in the installation step 58c comprises the switchable valve 22c. In installation step 58a, as an alternative to method step 58c, the further spray unit 16a of the wiper 18a is likewise connected to the pump 20a of the fixed spray unit 14a. In alternative installation step 58a, a new line unit 26a is additionally installed, which connects the further spray unit 16a to the pump 20a in addition to the fixed spray unit 14a. However, the line unit 26a installed during installation step 58a is designed without a switchable valve. In installation step 58b, which is an alternative to the installation step 58c, the further spray unit 16b of the wiper 18b is also connected to the pump 20b of the fixed spray unit 14b. In the further alternative installation step 58b, a new line unit 26b is installed, which connects the further spray unit 16b to the pump 20b instead of the fixed spray unit 14b. In this case, after retrofitting, the fixed spray unit 14b remains without a fluidic connection and thus without function. In at least one further installation step 62c, the further spray unit 16c is provided ready for operation.

Figure 5:
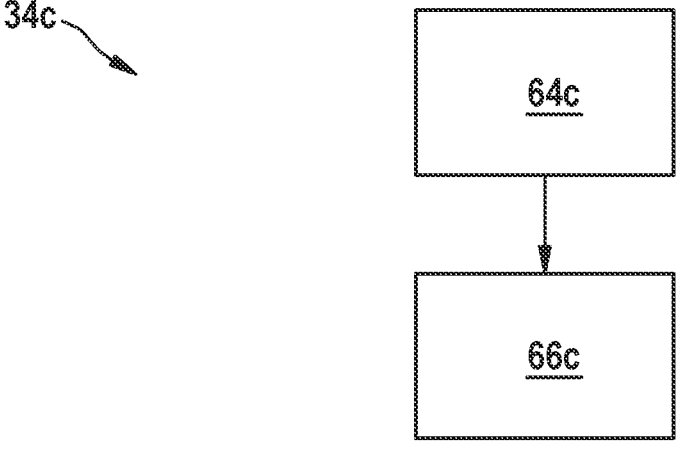

FIG. 5 shows a schematic flowchart of a method 34c for operating a retrofitted vehicle 10c. In operating step 64c, the further spray unit 16c of the wiper 18c or the fixed spray unit 14c is optionally activated. In operating step 64c, the selection between the fixed spray unit 14c and the further spray unit 16*c* of the wiper 18*c* is made by means of the switchable valve 22*c*. Depending on the selection of a valve position of the switchable valve 22*c*, in a further operating step 66*c*, the vehicle window 12*c* is sprayed with cleaning fluid by the further spray unit 16*c* of the wiper 18*c*, by the fixed spray unit 14*c*, or by the fixed spray unit 14*c* and simultaneously by the further spray unit 16*c* of the wiper 18*c*.

Figure 6:
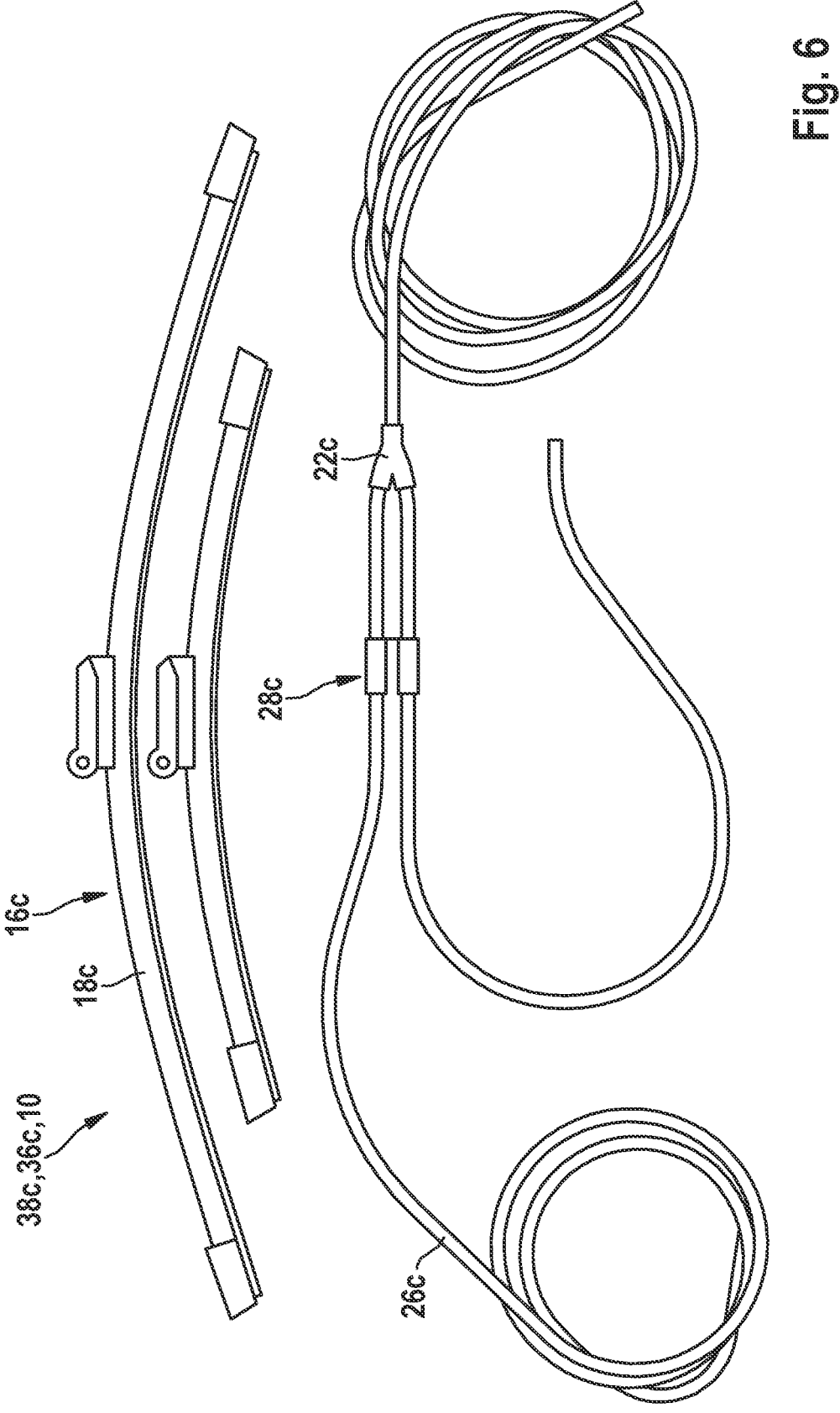

FIG. 6 shows, by way of example, one of a plurality of conceivable retrofitting systems 38*c* for retrofitting the vehicle 10*c* with the cleaning apparatus 36*c*. The retrofitting system 38*c* comprises the wiper 18*c* with the further spray unit 16*c*. The retrofitting system 38*c* comprises the line unit 26*c*. The retrofitting system 38*c* comprises the switchable valve 22*c*. The retrofitting system 38*c* comprises the check valve 28*c*.

Figure 7:
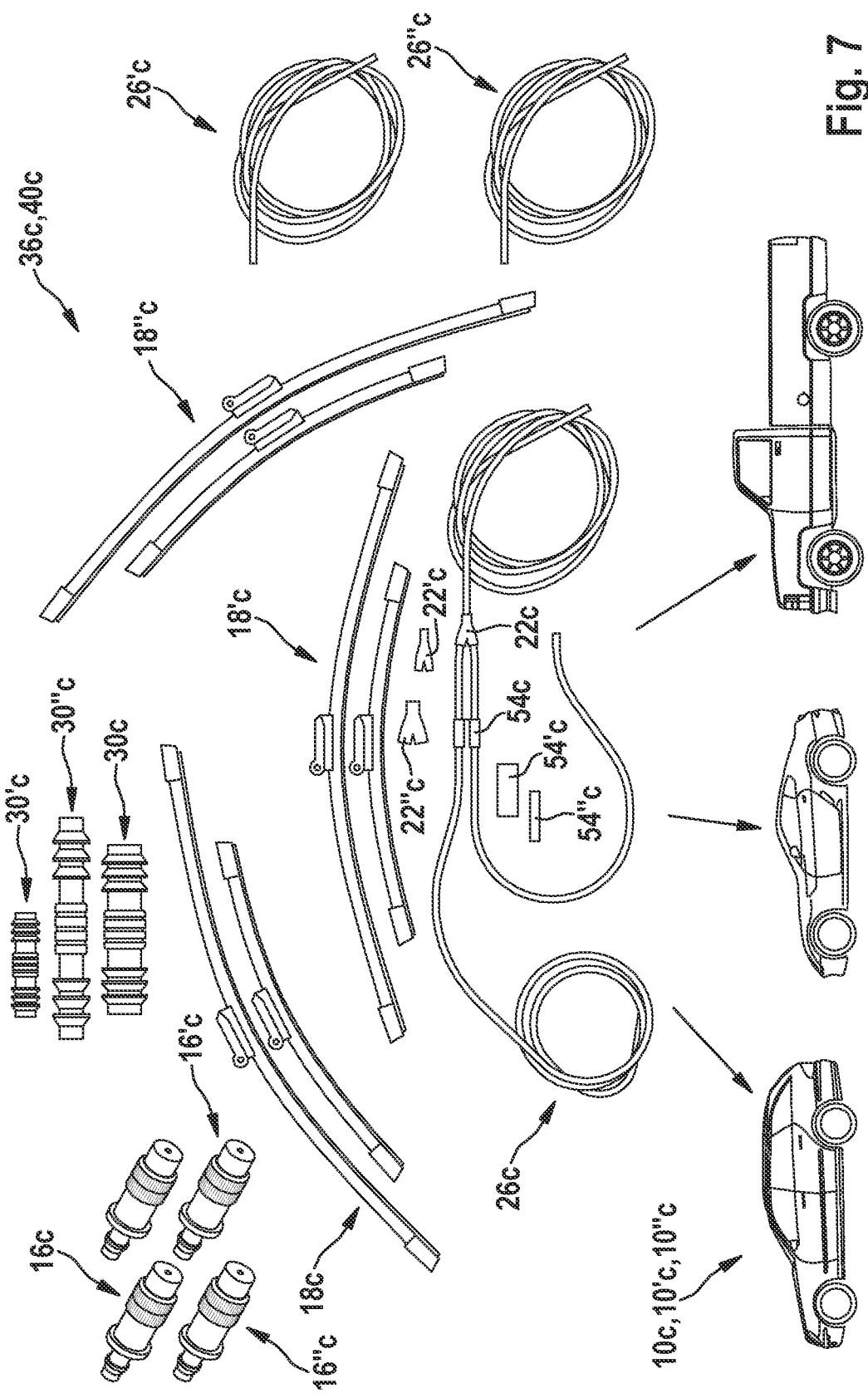

FIG. 7 shows a kit 40*c* for retrofitting various vehicles 10*c* with cleaning apparatuses 36*c*. By way of example, the kit 40*c* comprises various components for retrofitting of the further alternative cleaning apparatus 36*c*. Of course, the kit 40*c* could alternatively or additionally also comprise the components for the retrofitting of the further cleaning apparatuses 36*a*, 36*b* described herein. The kit 40*c* comprises a plurality of wipers 18*c*; 18'*c*; 18"*c* that are designed to differ from one another. The variously designed wipers 18*c*; 18'*c*; 18"*c* are provided for various vehicles 10*c*. The wipers 18*c*; 18'*c*; 18"*c* have variously designed further spray units 16*c*; 16'*c*; 16"*c*. The further spray units 16*c*; 16'*c*; 16"*c* have various diameters, various lengths, and various connectors for connecting to the wiper 18*c*; 18'*c*; 18"*c*. The kit 40*c* comprises a plurality of variously designed line units 26*c*; 26'*c*; 26"*c*. For example, the line units 26*c*; 26'*c*; 26"*c* differ in terms of their length and/or diameter. It is also conceivable that the line units 26*c*; 26'*c*; 26"*c* can be made of various materials or have various colors in order to facilitate association with various vehicles 10*c*. The line units 26*c*; 26'*c*; 26"*c* could also have vehicle-specific holders and/or profiles, such as curvatures or angles. The variously designed line units 26*c*; 26'*c*; 26"*c* are provided for various vehicles 10*c* that render various spray functions. The kit 40*c* comprises a plurality of various connecting pieces 54*c*; 54'*c*; 54"*c*. The connecting pieces 54*c*; 54'*c*; 54"*c* are provided for connecting the line unit 26*c*; 26'*c*; 26"*c* to the pump 20*c*; 20'*c*; 20"*c* and the further spray unit 16*c*; 16'*c*; 16"*c* and the fixed spray unit 14*c* in a fluidically sealed manner. The connecting pieces 54*c*; 54'*c*; 54"*c* have different diameters and different angles. The kit 40*c* comprises a 3-way valve 22*c*; 22'*c*; 22"*c*. The valve 22*c*; 22'*c*; 22"*c* has three openings with various diameters and various angles to one another. The kit 40*c* could optionally comprise a plurality of various adapters 30*c*; 30'*c*; 30'*c* for various pumps 20*c*; 20'*c*; 20"*c*. The kit 40*c* can also comprise the components for a retrofitting of the cleaning apparatuses 36*a*; 36*b*.

The invention claimed is:

1. A method (32*a*; 32*b*; 32*c*) for retrofitting a vehicle (10*a*; 10*b*; 10*c*), which is equipped with a fixed spray unit (14*a*; 14*b*; 14*c*) mounted to be fixed relative to a vehicle window (12*a*; 12*b*; 12*c*) of the vehicle (10*a*; 10*b*; 10*c*), the vehicle having a wiper (18*a*; 18*b*; 18*c*) comprising a further spray unit (16*a*; 16*b*; 16*c*) mounted to be movable relative to the vehicle window (12*a*; 12*b*; 12*c*), wherein the fixed spray unit (14*a*; 14*b*; 14*c*) comprises at least one pump (20*a*; 20*b*; 20*c*), which is provided for supplying a cleaning fluid pressure for the fixed spray unit (14*a*; 14*b*; 14*c*), wherein, in at least one installation step (58*a*; 58*b*; 58*c*), the further spray unit (16*a*; 16*b*; 16*c*) of the wiper (18*a*; 18*b*; 18*c*) is connected to the at least one pump (20*a*; 20*b*; 20*c*) of the fixed spray unit (14*a*; 14*b*; 14*c*), wherein in the at least one installation step (58*a*; 58*b*; 58*c*), the fixed spray unit (14*b*) is disconnected from the at least one pump (20*b*).

2. A cleaning apparatus (36*a*; 36*b*; 36*c*) in a vehicle (10*a*; 10*b*; 10*c*) retrofitted by the method (32*a*; 32*b*; 32*c*) according to claim 1, for cleaning a vehicle window (12*a*; 12*b*; 12*c*) of the vehicle (10*a*; 10*b*; 10*c*) using a cleaning fluid, the cleaning apparatus having the fixed spray unit (14*a*; 14*b*; 14*c*), the cleaning apparatus (36*a*; 36*b*; 36*c*) comprising:

at least one spray element (24*a*; 24*b*; 24*c*) of the fixed spray unit (14*a*; 14*b*; 14*c*) mounted to be fixed relative to the vehicle window (12*a*; 12*b*; 12*c*), at least one line unit (26*a*; 26*b*; 26*c*) for distributing the cleaning fluid pressurized by the at least one pump (20*a*; 20*b*; 20*c*), wherein the wiper (18*a*; 18*b*; 18*c*) is connected to the at least one pump (20*a*; 20*b*; 20*c*) via the at least one line unit (26*a*; 26*b*; 26*c*) instead of the fixed spray unit (14*a*; 14*b*; 14*c*).

3. The cleaning apparatus (36*a*; 36*b*; 36*c*) according to claim 2, wherein the at least one line unit (26*a*; 26*b*; 26*c*) leading to the further spray unit (16*a*; 16*b*; 16*c*) of the wiper (18*a*; 18*b*; 18*c*) comprises a check valve (28*a*; 28*b*; 28*c*) preventing a backflow of the cleaning fluid.

4. A kit (40*a*; 40*b*; 40*c*) for retrofitting various vehicles (10*a*; 10*b*; 10*c*) with cleaning apparatuses (36*a*; 36*b*; 36*c*) according to claim 2, the kit (40*a*; 40*b*; 40*c*) comprising at least:

a plurality of wipers (18*a*; 18*b*; 18*c*) designed to differ from one another, which are provided for various vehicles (10*a*; 10*b*; 10*c*) and/or comprise variously designed further spray units (16*a*; 16*b*; 16*c*), and a plurality of variously designed line units (26*a*; 26*b*; 26*c*), which are provided for various vehicles (10*a*; 10*b*; 10*c*) and/or provide various spraying functions.

5. The kit according to claim 4, further comprising a plurality of various adapters (30*c*; 30'*c*; 30"*c*) for various pumps (20*a*; 20*b*; 20*c*).

6. A vehicle (10*a*; 10*b*; 10*c*) having a cleaning apparatus (36*a*; 36*b*; 36*c*) according to claim 2.

* * * * *